US006418125B1

United States Patent
Oran

(10) Patent No.: US 6,418,125 B1
(45) Date of Patent: Jul. 9, 2002

(54) UNIFIED MIXING, SPEAKER SELECTION, AND JITTER BUFFER MANAGEMENT FOR MULTI-SPEAKER PACKET AUDIO SYSTEMS

(75) Inventor: David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/099,863

(22) Filed: Jun. 18, 1998

(51) Int. Cl.[7] .............................................. H04L 12/18
(52) U.S. Cl. ....................................... 370/266; 370/263
(58) Field of Search ................................. 370/260, 261, 370/262, 466, 263, 266, 268; 379/202, 203, 204

(56) References Cited

U.S. PATENT DOCUMENTS 5,127,001 A  *  6/1992  Steagall et al. ............. 370/266
5,206,886 A     4/1993  Bingham
5,889,764 A  *  3/1999  Needham et al. ........... 370/263
5,914,940 A  *  6/1999  Fukuoka et al. ............ 370/263

* cited by examiner

Primary Examiner—Douglas Olms
Assistant Examiner—Ken Vanderpuye
(74) Attorney, Agent, or Firm—Marger Johnson & McCollom, PC

(57) ABSTRACT

A receiver manages multiple speakers in a packet network telephone call. A packet gateway receives audio packets from the multiple speakers over the packet network. Memory in each receiver stores the audio packets and information about the multiple speakers in the telephone call. A processor selects which audio packets and what speaker information to retain in memory. The processor determines which of the selected audiopackets to store in memory and mix together to produce an audio output signal by determining from the speaker information which of the multiple speakers are actively talking and which speaker has not actively talked for the longest period of time.

41 Claims, 7 Drawing Sheets

RECEIVER-BASED TELEPHONY NETWORK

RECEIVER-BASED TELEPHONY NETWORK

UNIFIED MIXING, SPEAKER SELECTION, AND JITTER BUFFER MANAGEMENT FOR MULTI-SPEAKER PACKET AUDIO SYSTEMS

BACKGROUND OF THE INVENTION

The invention relates to managing audio packets in a packet-based audio system with multiple speakers and more particularly to adaptively selecting which audio packets to mix together as an audio signal depending on the active status of the multiple speakers.

In audio applications, there is often the need to talk with more than one speaker at a time. Functions such as conferencing and three-way calling require a receiver to separately handle multiple simultaneous and serial audio streams. In a circuit-switched system, such as the Public Service Telephone Network (PSTN), these functions are typically handled either by an edge switch or a special purpose device called an "audio bridge" or Multipoint Control Unit (MCU). In a packet audio system, there are better solutions to the transport of audio, such as using multicast transmission. These techniques, however, require the receivers to perform many of the processing functions of an MCU.

The processing-intensive task of processing calls from multiple speakers can not be reasonably assigned to the limited processing resources of individual receivers. For example, an interactive conference call conducted for a seminar might include hundreds of callers. Individual receivers do not have the processing resources to even track the state information for every caller at the seminar much less process the packets for each participant in the call.

Receiver-based systems do exist that process calls from multiple speakers. However, most receiver-based systems can only unintelligently select one of the speakers for playout at a time. Alternatively, receiver-based systems attempt to mix all speakers together until receiver resources are exhausted which end up producing an unintelligible playout. Therefore MCUs must be used even though the packet transmission system can deliver the audio packets directly to all the receivers using multicast. Using one MCU introduces a single point of failure, along with additional overhead and delay in the audio system as a whole.

Accordingly, a need remains for a receiver-based audio packet management system that intelligently selects which audio packets to mix together.

SUMMARY OF THE INVENTION

A receiver manages multiple speakers in a packet network. A packet gateway receives audio packets from the multiple speakers over the packet network. Memory in the receiver stores the audio packets and information about the multiple speakers in the telephone call. A processor selects which speaker audio packets and speaker information to retain in memory. The processor determines which of the selected-audio packets to store in memory-and mix together to produce an audio output signal by determining from the stored speaker information which of the multiple speakers are actively talking.

The speaker information is kept-in an indexed data array that identifies the speakers, a talking status for the speakers; and a pointer to buffers in memory that retain the audio packets for the speakers. Speaker entries in the data array also include a Least Recently Used (LRU) time indicating a local time the last audio packet was received for the speaker. The processor uses the LRU time to determine which speakers are actively talking and which speakers have stopped talking. A Talkspurt Packet Count indicates a single connected segment of audio. The processor uses the Talkspurt Packet Count to distinguish audio packets coming from a speaker who is actively talking from audio packets containing background noise.

The receiver identifies the status of the speaker entries in the data array as actively talking (A), not actively talking but valid (V) or not in use (F). Depending on available processing resources, the speaker status, LRU time, and Talkspurt Packet Count, speaker entries are stored, discarded or changed in the data array and audio packets from speakers are either stored or discarded in memory.

The invention solves the multi-speaker problem by using an adaptive speaker management scheme to intelligently select which speaker states and audio to retain and process. The receiver-based system is especially effective for demanding applications such as distance learning, where a professor is speaking most of the time, but an occasional question from a few of many listening students could arrive at any time. By judiciously using both processing resources and memory in the receiver, audio packets from multiple speakers are handled with less processing resources while at the same time improving audio quality.

The foregoing and other objects, features and advantages of the invention will become more readily apparent from the following detailed description of a preferred embodiment of the invention, which proceeds with reference to the accompanying drawings.

DETAILED DESCRIPTION

Figure 1:
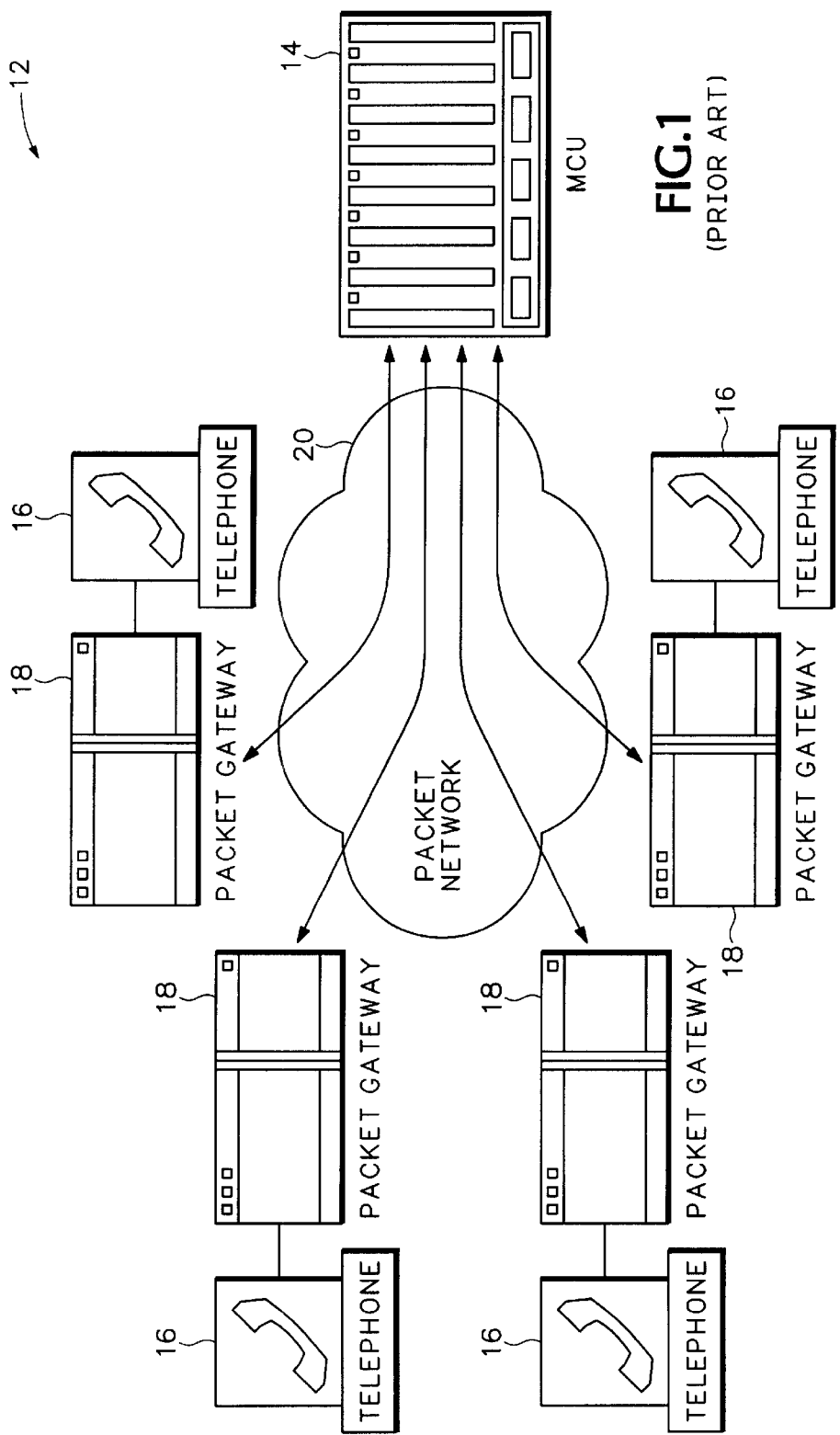
FIG. 1 shows a prior art Multipoint Control Unit (MCU)-based telephony network.

A prior art MCU-based system 12 is shown in FIG. 1. An MCU 14 takes the responsibility of listening to all speakers that may talk via telephones 16 and performs all mixing and speaker selection. The MCU 14 sends the resulting mixing/selected data stream to packet gateways 18. The packet gateways 18 connect the circuit-oriented telephones 16 that generate conventional telephony signals to a packet network 20. The packet gateways 18 perform the conversion between data packets containing audio data (audio packets) and audio signals passing to and from the telephones 16.

Even if multicast packets are used for outbound transmission from the MCU 14, extra overhead is incurred by first sending all packets to the MCU 14 rather than simply multicasting the packets directly to each packet gateway 18. MCU 18 uses a brut force method to mix of all speakers together and then send out the mixed signal to all packet gateways 18 in the conference call. The MCU-based network 20 therefore uses a large amount of bandwidth, is expensive and does not scale well to many simultaneous conversations. Further the MCU 18 represents a single point of failure in the network 20. There is also a potential added transmission delay incurred by having to first send audio packets through the MCU 14 before being relayed to the packet gateways 18.

Figure 2:
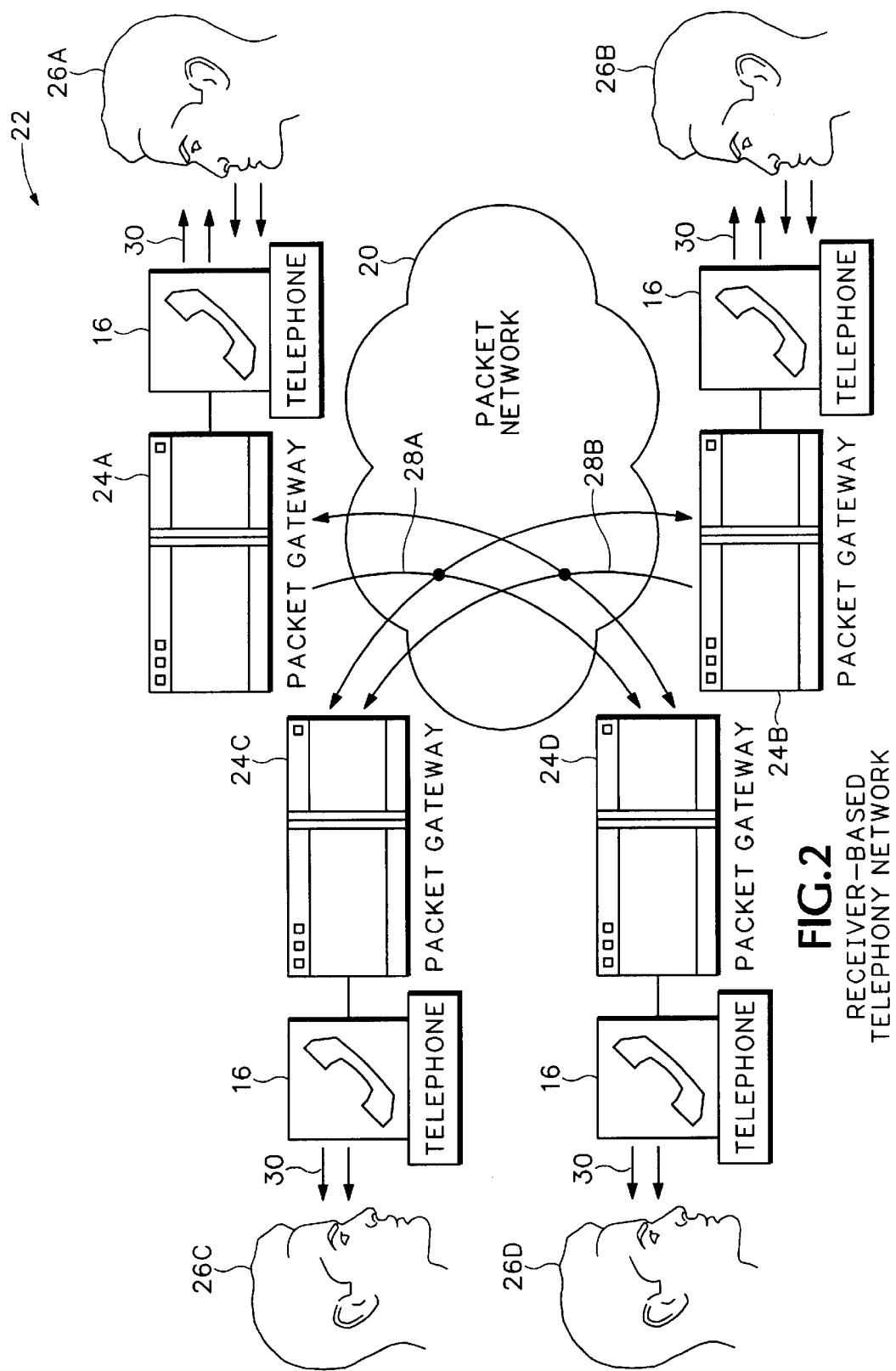
FIG. 2 shows a receiver-based telephony network according to the invention.

Referring to FIG. 2 a receiver-based system 22 according to the invention includes multiple receivers 24A–24D that receive and process multicast (or unicast) packets. Multiple speakers 26A–26D speak and listen through conventional telephones 16. Packet-gateway circuitry contained within the receivers 24A–24D is similar to the packet-gateways 18 described in FIG. 1. The packet-gateways convert the conventional telephony signals produced by telephones 16 into audio packets that are sent out on packet network 20. The audio packets are either multicast or unicast to the other packet-gateways in receivers 24A–24D. The packet-gateways also convert audio packets received from network 20 back into telephony signals that are output through telephones 16. Audio packets sent from active speakers, for example, speakers 26A and 26B, are represented by arrows 28A and 28B, respectively.

The system shown in FIG. 2 includes telephones 16. However, the invention can be used with any multi-speaker packet audio system, irrespective of whether physical telephones are used. For example, the gateways 24A–D and telephones 16 could be replaced with personal computers (PC's) running a conferencing application.

If processing and memory were not a concern, state information could be kept at each receiver 24A–24D for all potential speakers 26A–26D, and for all those speakers who might be talking at any given time. State information includes things like audio gain, network delay between different callers, voice encoding schemes, etc. However, retaining status information and decoding only a single audio stream is a process intensive operation. For example, over 15 Million Instructions Per Second (MIPs) is required to process a G.729 compressed voice stream.

Figure 3:
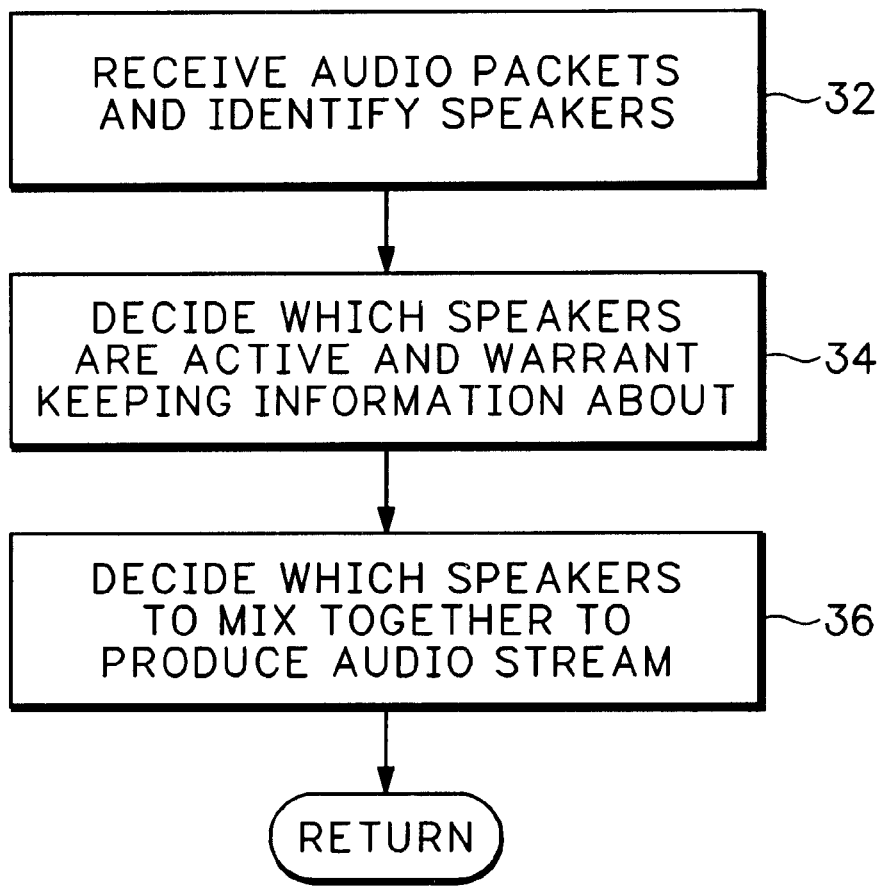
FIG. 3 shows a flow diagram describing the primary functions performed by a receiver in the receiver-based telephony network shown in FIG. 2.

In order to generate an intelligible audiostream from all the received audio packets, each receiver 24A–24D performs the speaker management scheme described in FIG. 3. Referring to FIGS. 2 and 3, each receiver 24A–24D receives audio packets and identifies the speakers 26A–26D associated with the audio packets in step 32.

In step 34, each receiver decides which speakers are currently "active" and warrant keeping information about. For example, a panel session may have hundreds of potential speakers. The receiver in step 34 determines which speakers are part of the audience and only rarely ask questions and which speakers are on the panel and are talking frequently. It is important to keep information about a speaker even if that speaker is not currently talking. This is because audio decoders (not shown) work much better when adapted to current network conditions, which vary from speaker to speaker. Also, each speaker 26A–26D may be in a different part of the packet network 20 relative to the receiver. The audio packets experience different delay and delay dispersion while traversing the network 20. This state processing is referred to as "adaptive jitter buffer processing", and is well known in the art. The receiver in step 34 retains information on selected speakers that appear to be actively participating in the telephone conference.

Of the speakers who are identified "active", each receiver 24A–24D in step 36 independently decides which speakers to mix together to produce an output audio stream. At any given time, more than one speaker may be talking at the same time. It is important to mix at least a few speakers together to allow persons speaking at the same time to backoff. It is also important to mix as many active speakers as possible to promote easier conversation between the different conference call participants. The receiver in step 36 selects and mixes together the greatest number of speakers it has then processing resources to handle, choosing those that are most likely to be actively talking.

The receivers 24A–24D use certain attributes that are already supported in existing packet-based networks. These attributes are well known to those skilled in the art. For example, voice packet transport is supported in the "Real-Time Transport Protocol" described in RTP—Internet Request for Comments 1889. The RTP parameters can be used in the speaker management scheme according to the invention.

The speaker management scheme assumes reliable indication of which speakers 26A–26D (FIG. 2) are associated with which audio packet, independent of whether it arrives via unicast or multicast. This can be provided from the RTP "Synchronization Source" or SSRC. An indication of the beginning of a Talkspurt is provided by an RTP "Marker Bit". A Talkspurt is a series of packets representing a single connected segment of audio. Identification of packet ordering is provided by an RTP "Sequence Number". Identification of a sampling instant of the audio packet by the source is provided by an RTP "Timestamp". The RTP Timestamp is a sampling timestamp of the speech contained in an audio packet indicating when a transmitter sampled an audio signal: For ease of description, the RTP terms for these attributes are used below. However, any equivalent audio packet transport protocol can be used with the speech management scheme used with the receivers 24A–24D.

Figure 4:
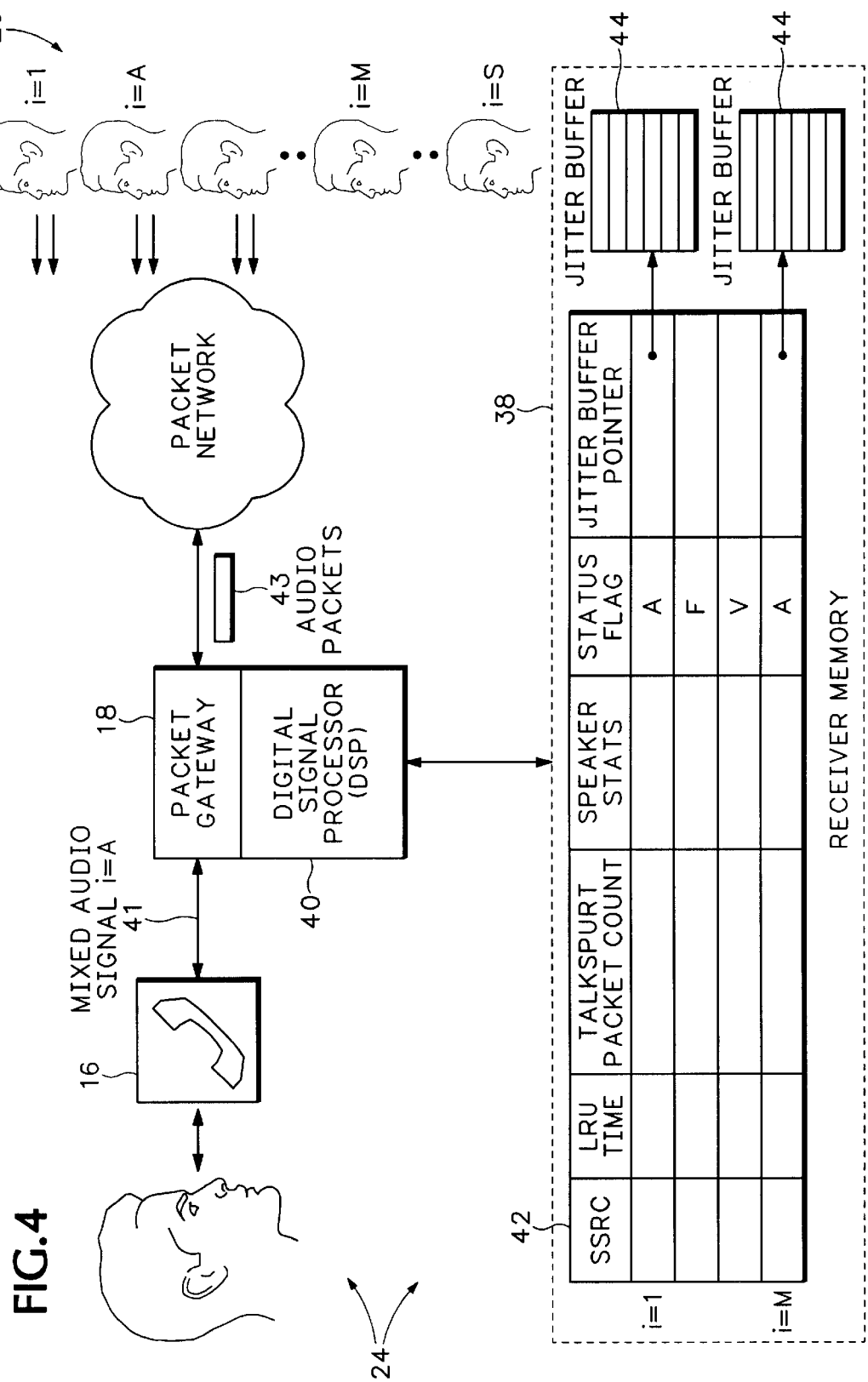
FIG. 4 shows a receiver for the telephony network shown in FIG. 2.

Referring to FIG. 4, for any given audio session, there is some number of potential speakers 26. Call this value S. The receiver 24 has enough memory 38 to keep state information in data array 42 for some subset of these speakers 26. Call this value M. For simple three-way calling and small audio conferences it is likely that M>S, but for larger conferences it is possible that S>>M. At any given time it is possible that more than one participant is speaking. Intelligibility decreases rapidly with the number of speakers 26. Mixing speakers 26 is still necessary since the participants in a call depend on the auditory cues of other speaker collisions to back off and limit the number of speakers at any one time. Therefore, the management scheme according to the invention determines which M of the S speakers 26 the receiver 24 will retain state information.

A Digital Signal Processor (DSP) 40 is used in each receiver 24A–24D rather than decoding the audio stream with software in a general purpose processor. While the invention can be employed in a pure-software or pure-hardware environment, it is best suited to implementation by DSP 40. DSPs are well known to those skilled in the art and are therefore not described in further detail. As mentioned above, for a non-telephony system, the telephone 16 and packet gateway 18 are replaced with a general purpose computer.

The DSP 40 (or software implementation) works in conjunction with the packet gateways 18 and has the processing speed to actually decode and mix the audio from only a subset of speakers (A) from the M speakers it has state information about. Usually M<S, with typical values of 1–2 for M. The DSP 40 decides which A of the M active speakers are actually mixed and which of the M speakers are ignored. It is important to note that the number of speakers 26 that are actually mixed A is a subset of the number of active speakers M. By maintaining stats on active speakers M and then intelligently selecting which of the A speakers to mix, the receivers 24 provide a more intelligible audio stream while requiring fewer processing resources.

The receiver 24 provides a novel scheme for determining which M of the S speakers state information are maintained at any given instant in data array 42. The receiver 24 also provides a novel scheme for determining which A of the M speakers are actually decoded and mixed.

The data array 42 keeps information about the M speakers. Each row in the data array 42 represents a speaker entry containing the state information for one of the M speakers. The SSRC is used to match speaker entries in the data array 42 with audio packets 43.

The LRU Time contains the local time the last audio packet 43 was received for the speaker 24 (i.e., not the timestamp in the packet—that is used for playout only). The speaker is located by hashing or binary searching on the SSRC field for that speaker entry. Direct indexing by SSRC is impractical, as SSRCs tend to be large numbers, such as the 32 bits used in RTP. The LRU Time is used to detect old speaker entries that can be replaced by new speakers.

The Talkspurt Packet Count contains the number of packets received for this speaker since the beginning of its last Talkspurt (as indicated by the marker bit in the case of RTP). This is used to detect continuous speakers—ones for which either Voice Activated Detection (VAD) is not available, or who appear to be continuously talking due to background noise or other effects.

The Speaker Stats contain a variety of information about a speaker 26 used for sizing and operating a jitter buffer 44 when the speaker 26 is active. In particular, the Speaker Stats remember the delay and delay variance experienced by this speaker's audio packets 43. This allows an appropriate playout point to be chosen for the jitter buffer 44 if and when the speaker 26 becomes active again. Speaker Stats are the main reason why entries are kept in the data array 42 for non-active speakers.

The Status Flag entry (A) is used to indicate whether a particular speaker 26 has an active jitter buffer 44 and is having its packets decoded and mixed into a mixed output audio signal 41. The Status Flag entry (V) is used to identify either an inactive speaker or a speaker who is being ignored in favor of another speaker who is active. Status Flag entry (F) identifies a speaker free to be used or reused by another speaker 26. A Jitter Buffer Pointer points to the actual jitter buffer 44 where the received audio packets 43 for an active speaker are stored awaiting decode and playout.

Figure 5A:
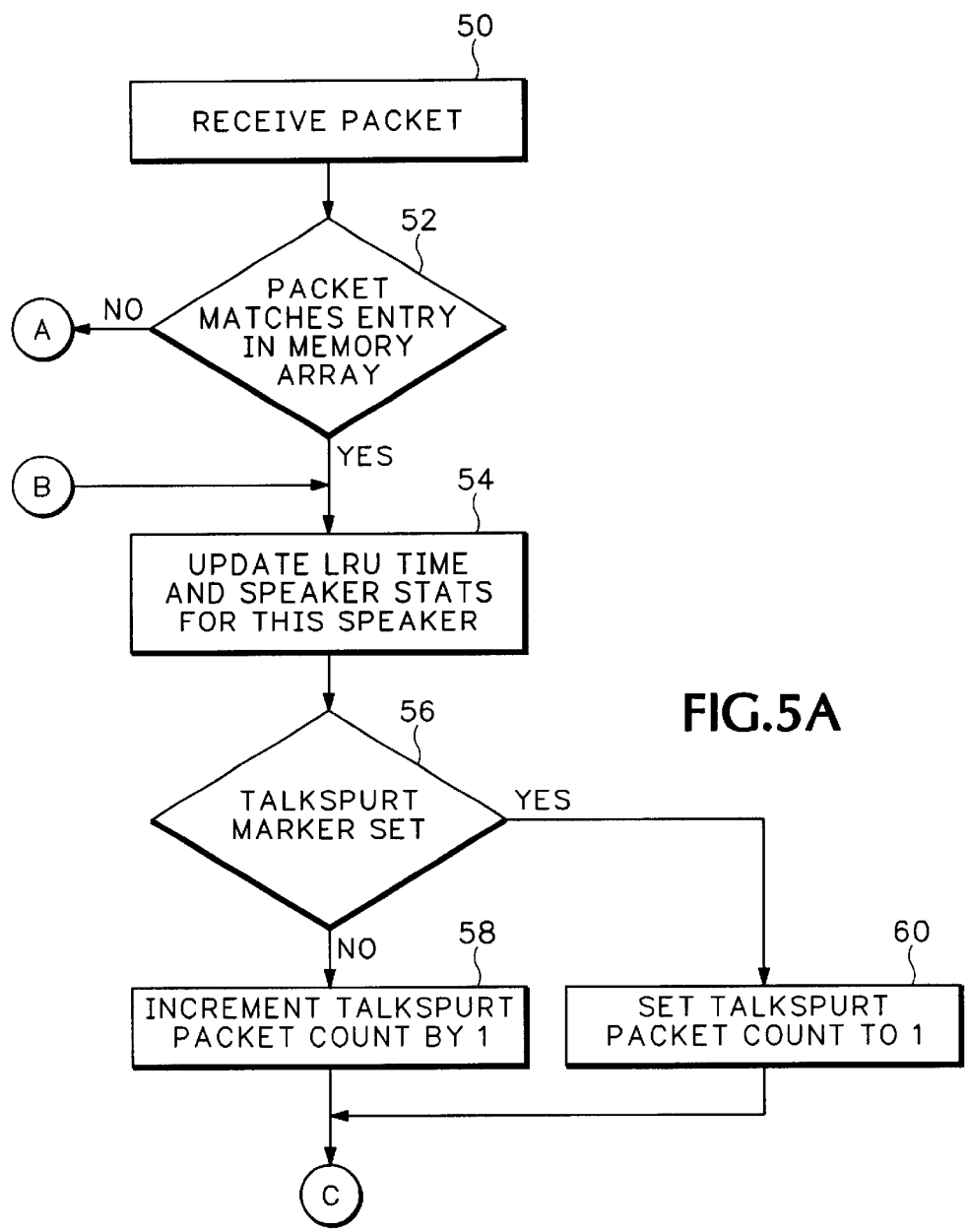
FIGS. 5A-5C shows a flow diagram describing how the receiver shown in FIG. 4 operates.
Figure 5B:
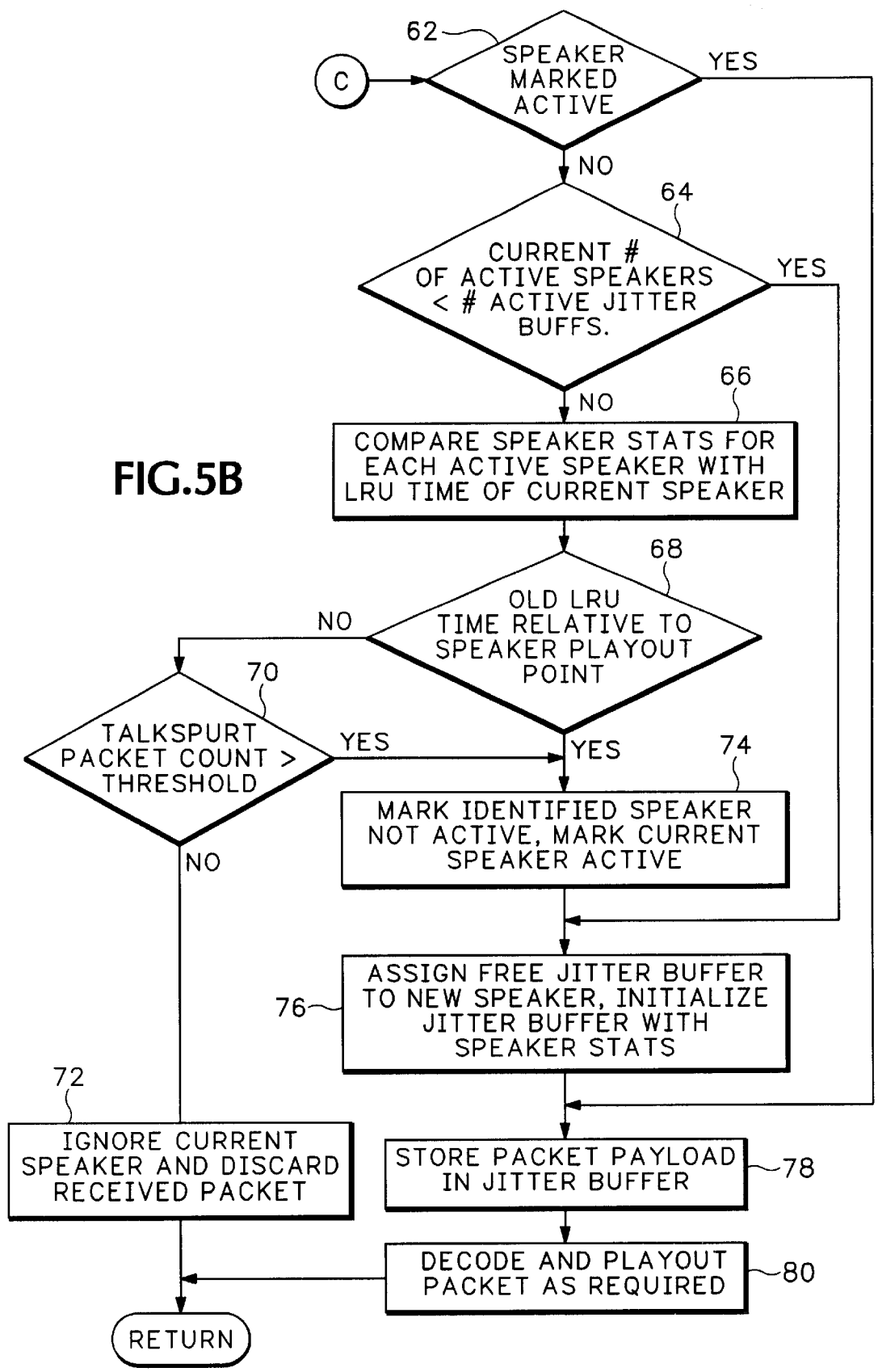
Figure 5C:
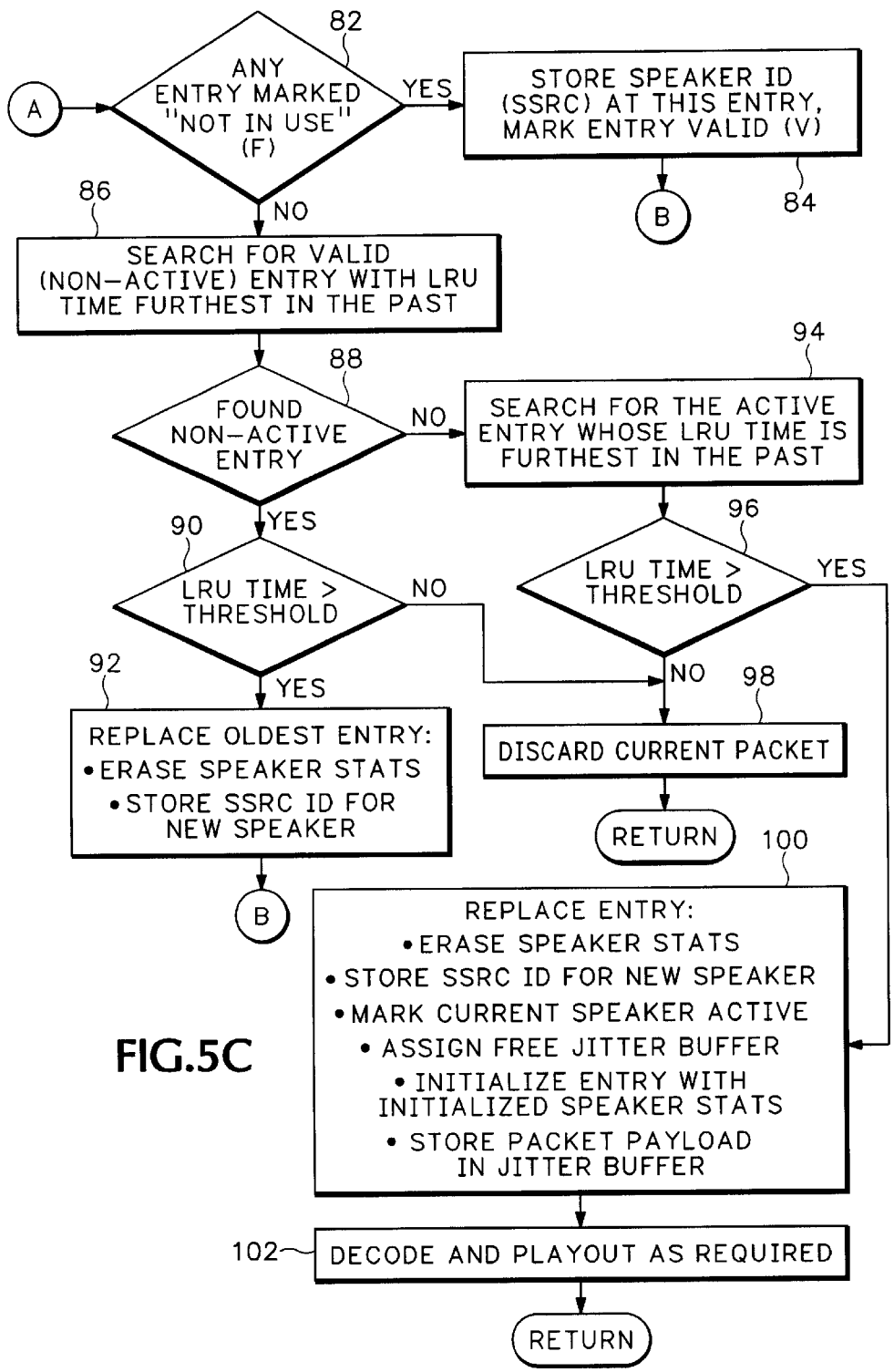

FIGS. 5A–5C show how the DSP 40 manages the speaker entries in data array 42 to determine which audio packets 43 are discarded, stored, or used in the mixed audio signal 41 (FIG. 4). The data array 42 is updated in step 50 every time an audio packet 43 is received by the packet gateway 25 from any of the S speakers 26 in the session. The SSRC in the audio packet 43 (FIG. 4) is used in step 52 to locate a corresponding entry in the data array 42. If an entry in data array 42 is found, the LRU Time and Speaker Stats for this speaker entry are updated in step 54. If the Talkspurt marker in the audio packet is set in step 56, indicating a new Talkspurt, the Talkspurt packet count is set to 1 in step 60. Otherwise the Talkspurt packet count is incremented by 1 in step 58.

If the speaker entry in data array 42 belonging to the audio packet 43 is marked active in decision step 62, the packet payload is stored in the jitter buffer 44 assigned to the active speaker in step 78. The audio packets in the jitter buffer 44 are decoded and played-out as appropriate in step 80. The receiver 24 is then done with this packet 43 and returns to step 50 to process the next audio packet.

If the speaker entry associated with the current packet 43 is not marked active in decision step 62, decision step 64 checks to see if the current number of active speakers is less than the number of supported jitter buffers 44. If so, a free jitter buffer 44 is assigned to the speaker entry and initialized with the stored Speaker Stats in step 76. The packet payload is stored in the jitter buffer in step 78 and decoded and played-out as appropriate in step 80. The receiver 24 is then done with this packet 43 and returns to receive the next packet in step 50.

As discussed above, the LRU time is the timestamp of the audio sampling most recently received for a speaker. If the LRU time for one or more of the speaker entries occurs a certain amount of time in the past, it is assumed that the speaker has stopped talking. In an audio conversation there is only significant audio information in about 30% of the conversation duty cycle. The remainder of the conversation contains pauses in a person's speech at the end of sentences or when another person in the conversation starts talking. Thus, the receivers 24 cannot rely solely on the termination of an audio packet stream to determine whether a speaker has stopped talking.

The receivers 24 must interact with intelligent endpoints that stop sending audio packets when a speaker stops speaking. The receiver 24 might also need to interact with endpoints that send a continuous stream of packets even when the speaker is not speaking. A series of connected speech between two pauses is referred to as a Talkspurt. An endpoint may be fooled when the speaker is not actively talking but continues to send audio packets because of a noisy background environment.

Accordingly, if the current number of active speakers is not less than the number of active jitter buffers, the receiver in step 66 compares the Speaker Stats for each active speaker entry with the LRU Time of the current speaker. Decision step 68 identifies any speaker having an old LRU Time relative the current speaker's playout point. Decision step 70 identifies the Talkspurt packet count for any speaker entry exceeding a predetermined threshold value. The threshold value in decision step 70 depends on the coding algorithm in use. This indicates a speaker that has probably stopped talking but the transmitter is still sending packets caused by background noise. Any speaker entry identified in either decision step 68 or decision step 70 is marked inactive and the current speaker is marked active in step 74. A jitter buffer is assigned to the current speaker and the jitter buffer initialized with the Speaker Stats for the current speaker in step 76. The packet payload for the current audio packet 43 is stored in the jitter buffer in step 78 and the contents of the jitter buffer decoded and played-out as appropriate in step 80. The receiver 24 then jumps back to step 50 to process the next audio packet 43.

If no speaker entry is identified in either decision step 68 or decision step 70, the active speaker entries are probably still talking. Accordingly, the current speaker is ignored and the audio packet discarded in step 72. The receiver 24 then jumps back to step 50 and waits to receive the next audio packet 43.

If the current packet 43 does not match any entry in the data array 42 in decision step 52, this speaker 26 has either not been heard from before, or has been ignored because there has not been enough space in the memory array 42 to remember this speaker. If there is any speaker entry marked not in use (F) in decision step 82, that speaker entry is replaced with the SSRC for the new speaker and the speaker entry marked valid (V) in step 84. The receiver 24 then jumps to step 54 and updates the LRU time and speaker stats and further processes the current audio packet 43 as described above.

If there is no entry marked "not in use" (f), the valid (i.e., not active) speaker entry with the furthest LRU Time in the past is identified in step 86. If a non-active speaker entry is found in decision step 88 but the LRU Time does not exceed a small "protection threshold" in decision step 90, the current packet is silently discarded in step 98. The "protection threshold" in decision step 90 prevents a currently active speaker that is taking a short pause (e.g., at the end of a sentence) from being replaced. If the LRU time exceeds the "protection threshold", the oldest nonactive speaker entry is replaced in step 92. The Speaker Stats of the oldest speaker entry are erased and the SSRC for the new speaker is stored in the data array 42. The receiver then jumps back to step 54.

If no non-active speaker entries are found in decision step 88, the active speaker entry which an LRU Time furthest in the past is identified in step 94. If the LRU Time does not exceed the "protection threshold" in decision step 96 (the speaker has not stopped talking), the current audio packet 43 is discarded in step 98. If the LRU Time exceeds the "protection threshold" in decision step 96 (which only occurs if that speaker has in fact stopped talking), the identified speaker entry in data array 42 is replaced in step 100. The speaker entry is replaced by erasing the Speaker Stats of the identified speaker entry, storing the SSRC for the current speaker, marking the current speaker active, assigning a free jitter buffer to the current speaker, initializing the jitter buffer with the initialized Speaker Stats for the current speaker, and storing the packet payload in the jitter buffer. Step 102 then proceeds with decoding and playout of the current speaker as appropriate. The receiver 24 then jumps back to step 50 to receive the next audio packet.

The speaker management scheme provides many of the capabilities of an MCU while using drastically less processing resources. By adaptively updating and selecting active speakers for voice processing at each local receiver, network bandwidth is reduced and scalability dramatically increased. Thus, the invention improves the sound quality of voice-over-IP (VoIP) networks using fewer resources.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A system for managing multiple speakers in a packet network, comprising:
    a network interface receiving audio packets and speaker information from the multiple speakers over the packet network;
    memory for storing audio packets and information from the multiple speakers; and
    a processor selecting which audio packets and speaker information to store in memory and mix together to produce an audio output signal by determining which of the multiple speakers appear to be actively talking by comparing a local time that indicates when the audio packets are received locally for the multiple speakers with a local time for audio packets of a currently active speaker and identifying any audio packets having a local time that exceeds the local time of the currently active speaker by a predetermined threshold value.

2. A system A system for managing multiple speakers in a packet network, comprising:
    a network interface receiving audio packets and speaker information from the multiple speakers over the packet network;
    memory for storing audio packets and information from the multiple speakers; and
    a processor selecting which audio packets and speaker information to store in memory and mix together to produce an audio output signal by determining which of the multiple speakers appear to be actively talking;
    wherein the speaker information comprises a data array of speaker entries each associated with an individual one of the speakers, each speaker entry containing statistics for the associated speaker and a pointer to a location in memory retaining audio data for the associated speaker.

3. A system according to claim 2 wherein each speaker entry in the data array includes an LRU time indicating a local time a last audio packet was transmitted by the speaker.

4. A system according to claim 3 wherein the processor uses the LRU time to determine which speakers are actively talking and which speakers are not actively talking.

5. A system according to claim 2 wherein each speaker entry includes a Talkspurt Packet Count indicating a single connected segment of audio for the associated speaker.

6. A system according to claim 5 wherein the processor uses the Talkspurt Packet Count to determine which speakers are not actively talking but continue to send audio packets containing background noise.

7. A system according to claim 2 wherein the processor tags the speaker entries in the data array as actively talking (A), not actively talking but valid (V) or not in use (F).

8. A system for managing multiple speakers in a packet network, comprising:
    a network interface receiving audio packets and speaker information from the multiple speakers over the packet network,
    memory for storing audio packets and information from the multiple speakers, and
    a processor selecting which audio packets and speaker information to store in memory and mix together to produce an audio output signal by determining which of the multiple speakers appear to be actively talking,
    a receiver at each speaker location that independently determines which audio packets and speaker information to retain in memory and which of the audio packets to mix together to produce an audio output signal by determining from the audio packets and retained speaker information which of the multiple speakers are actively talking and when the multiple speakers have stopped actively talking.

9. A system according to claim 1 wherein the network interface comprises a packet gateway or a personal computer.

10. A system according to claim 1 wherein the audio packets from each speaker are multicast or unicast directly to every other speaker over the packet network.

11. A method for managing multiple speakers in a packet network comprising:
    receiving audio packets from the multiple speakers over the packet network;
    selectively storing speaker information for the multiple speakers;
    selectively storing or discarding the received audio packets and mixing stored audio packets to produce an audio output signal by determining from the stored speaker information which speakers are actively talking, when speakers have stopped actively talking and which speakers are not likely to start actively talking according to a count indicating a number of packets received from each of the multiple speakers since beginning a last talkspurt.

12. A method for managing multiple speakers in a packet network comprising:

receiving audio packets from the multiple speakers over the packet network;

selectively storing speaker information for the multiple speakers;

selectively storing or discarding the received audio packets and mixing stored audio packets to produce an audio output signal;

determining from the stored speaker information which speakers are actively talking, when speakers have stopped actively talking and which speakers are not likely to start actively talking;

wherein the speaker information comprises an array of speaker entries each identifying an associated one of the speakers; and replacing the stored speaker information for one of the speakers that has been identified as not likely to start actively talking with speaker information for a newly identified active speaker.

13. A method for managing multiple speakers in a packet network comprising:

receiving audio packets from the multiple speakers over the packet network;

selectively storing speaker information for the multiple speakers;

selectively storing or discarding the received audio packets and mixing stored audio packets to produce an audio output signal by determining from the stored speaker information which speakers are actively talking, when speakers have stopped actively talking and which speakers are not likely to start actively talking;

wherein the speaker information comprises an array of speaker entries each identifying an associated one of the speakers;

receiving a new audio packet;

identifying any speaker entry belonging to the new audio packet; and updating a LRU time and a Talkspurt Count for any identified speaker entry.

14. A method according to claim 12 including the following:

receiving a new audio packet;

identifying any speaker entry belonging to the new audio packet; and storing the new audio packet in memory when a speaker entry is identified and labeled as belonging to a speaker who is actively talking.

15. A method for managing multiple speakers in a packet network comprising:

receiving audio packets from the multiple speakers over the packet network;

selectively storing speaker information for the multiple speakers;

selectively storing or discarding the received audio packets and mixing stored audio packets to produce an audio output signal by determining from the stored speaker information which speakers are actively talking, when speakers have stopped actively talking and which speakers are not likely to start actively talking;

wherein the speaker information comprises an array of speaker entries each identifying an associated one of the speakers;

receiving a new audio packet;

identifying any speaker entry belonging to the new audio packet;

storing the new audio packet in memory when a speaker entry is identified and labeled as belonging to a speaker who is actively talking;

checking whether a current number of active speaker entries is less than available audio packet storage; and storing the new audio packet in memory when the speaker entry for the new audio packet is not active but the available packet storage is greater than the number of active speaker entries.

16. A method for managing multiple speakers in a packet network comprising:

receiving audio packets from the multiple speakers over the packet network;

selectively storing speaker information for the multiple speakers;

selectively storing or discarding the received audio packets and mixing stored audio packets to produce an audio output signal by determining from the stored speaker information which speakers are actively talking, when speakers have stopped actively talking and which speakers are not likely to start actively talking;

wherein the speaker information comprises an array of speaker entries each identifying an associated one of the speakers; and changing a first speaker entry from active to not active and changing a second speaker entry for a current audio packet to active when the first speaker entry has not generated an audio packet for a predetermined amount of time or when the first speaker entry has generated more than a predetermined number of audio packets in one continuous audio stream.

17. A method for managing multiple speakers in a packet network comprising:

receiving audio packets from the multiple speakers over the packet network;

selectively storing speaker information for the multiple speakers;

selectively storing or discarding the received audio packets and mixing stored audio packets to produce an audio output signal by determining from the stored speaker information which speakers are actively talking, when speakers have stopped actively talking and which speakers are not likely to start actively talking;

wherein the speaker information comprises an array of speaker entries each identifying an associated one of the speakers; and replacing an unused speaker entry with a speaker entry for a new audio packet when the new audio packet does not belong to an existing speaker entry.

18. A method for managing multiple speakers in a packet network comprising:

receiving audio packets from the multiple speakers over the packet network;

selectively storing speaker information for the multiple speakers;

selectively storing or discarding the received audio packets and mixing stored audio packets to produce an audio output signal by determining from the stored speaker information which speakers are actively talking, when speakers have stopped actively talking and which speakers are not likely to start actively talking;

wherein the speaker information comprises an array of speaker entries each identifying an associated one of the speakers;

searching for a speaker entry that belongs to a new audio packet;

searching for a non-active speaker entry when no existing speaker entry exists for the new audio packet; and replacing an identified non-active speaker entry with a new speaker entry for the new audio packet.

19. A method according to claim 18 including the following:

identifying an active speaker entry not actively talking for the longest amount of time when no non-active speaker entry is identified;

determining whether the identified active speaker entry has stopped talking;

replacing the identified active speaker entry with a new speaker entry for the new audio packet if the identified active speaker entry has stopped talking; and discarding the current packet when the identified active speaker entry is still actively talking.

20. A method for managing multiple speakers in a packet network comprising:

receiving audio packets from the multiple speakers over the packet network;

selectively storing speaker information for the multiple speakers;

selectively storing or discarding the received audio packets and mixing stored audio packets to produce an audio output signal by determining from the stored speaker information which speakers are actively talking, when speakers have stopped actively talking and which speakers are not likely to start actively talking;

wherein the speaker information comprises an array of speaker entries each identifying an associated one of the speakers;

identifying for each speaker entry in the data array the following:
  a speaker identification value;
  when the speaker last talked;
  how long it appears that the speaker has been talking;
  speaker statistics;
  a tag indicating the speaker activity status; and
  a pointer to a buffer for storing an audio portion of associated audio packets.

21. A method according to claim 11 including independently storing and discarding new audio packets and audio packets for each one of the multiple speakers depending upon which of the multiple speakers are actively talking and which speakers have not actively talked for a longest period of time.

22. A receiver-based telephony system, comprising:

a packet-based network transmitting audio packets from multiple speakers;

multiple packet gateways receiving audio packets from the multiple speakers on the packet-based network; and a receiver at each one of the packet gateways that adaptively stores talking status information for the multiple speakers and manages which of the audio packets are stored and mixed into an audio signal depending upon which speakers are actively talking and which speakers have not actively talked for a longest period of time.

23. A system for managing multiple speakers in a packet network, comprising:

means for receiving audio packets from the multiple speakers over the packet network;

means for selectively storing speaker information for the multiple speakers;

means for selectively storing or discarding the received audio packets and mixing stored audio packets to produce an audio output signal by determining from the stored speaker information from the audio packets received from active and nonactive speakers which speakers are actively talking, when speakers have stopped actively talking and which speakers are not likely to start actively talking; and means for replacing the stored speaker information for one of the speakers that has been identified as not likely to start actively talking with speaker information for a newly identified active speaker.

24. A system for managing multiple speakers in a packet network comprising:

means for receiving audio packets from the multiple speakers over the packet network;

means for selectively storing speaker information for the multiple speakers;

means for selectively storing or discarding the received audio packets and mixing stored audio packets to produce an audio output signal by determining from the stored speaker information which speakers are actively talking when speakers have stopped actively talking and which speakers are not likely to start actively talking;

wherein the speaker information comprises speaker entries each identifying an associated one of the speakers;

means for identifying when the stored speaker information is greater then a number of available active jitter buffers; and means for replacing the stored speaker information for one of the speakers that has been identified as not likely to start actively talking with speaker information for a newly identified active speaker.

25. A system for managing multiple speakers in a packet network comprising:

means for receiving audio packets from the multiple speakers over the packet network;

means for selectively storing speaker information for the multiple speakers;

means for selectively storing or discarding the received audio packets and mixing stored audio packets to produce an audio output signal by determining from the stored speaker information which speakers are actively talking, when speakers have stopped actively talking and which speakers are not likely to start actively talking;

wherein the speaker information comprises speaker entries each identifying an associated one of the speakers;

means for receiving a new audio packet;

means for identifying any speaker entry belonging to the new audio packet; and means for updating a LRU time and a Talkspurt Count for any identified speaker entry.

26. A system for managing multiple speakers in a packet network comprising:

means for receiving audio packets from the multiple speakers over the packet network;

means for selectively storing speaker information for the multiple speakers;

means for selectively storing or discarding the received audio packets and mixing stored audio packets to produce an audio output signal by determining from the stored speaker information which speakers are actively talking, when speakers have stopped actively talking and which speakers are not likely to start actively talking;

wherein the speaker information comprises speaker entries each identifying an associated one of the speakers;

means for receiving a new audio packet;

means for identifying any speaker entry belonging to the new audio packet; and means for storing the new audio packet in memory when a speaker entry is identified and labeled as belonging to a speaker who is actively talking.

27. A system according to claim 26 including the following:

means for checking whether a current number of active speaker entries is less than available audio packet storage; and means for storing the new audio packet in memory when the speaker entry for the new audio packet is not active but the available packet storage is greater than the number of active speaker entries.

28. A system for managing multiple speakers in a packet network comprising:

means for receiving audio packets from the multiple speakers over the packet network;

means for selectively storing speaker information for the multiple speakers;

means for selectively storing or discarding the received audio packets and mixing stored audio packets to produce an audio output signal by determining from the stored speaker information which speakers are actively talking, when speakers have stopped actively talking and which speakers are not likely to start actively talking;

wherein the speaker information comprises speaker entries each identifying an associated one of the speakers; and means for changing a first speaker entry from active to not active and changing a second speaker entry for a current audio packet to active when the first speaker entry has not generated an audio packet for a predetermined amount of time or when the first speaker entry has generated more than a predetermined number of audio packets in one continuous audio stream.

29. A system for managing multiple speakers in a packet network comprising:

means for receiving audio packets from the multiple speakers over the packet network;

means for selectively storing speaker information for the multiple speakers;

means for selectively storing or discarding the received audio packets and mixing stored audio packets to produce an audio output signal by determining from the stored speaker information which speakers are actively talking, when speakers have stopped actively talking and which speakers are not likely to start actively talking;

wherein the speaker information comprises speaker entries each identifying an associated one of the speakers; and means for replacing an unused speaker entry with a speaker entry for a new audio packet when the new audio packet does not belong to an existing speaker entry.

30. A system for managing multiple speakers in a packet network comprising:

means for receiving audio packets from the multiple speakers over the packet network;

means for selectively storing speaker information for the multiple speakers;

means for selectively storing or discarding the received audio packets and mixing stored audio packets to produce an audio output signal by determining from the stored speaker information which speakers are actively talking, when speakers have stopped actively talking and which speakers are not likely to start actively talking;

wherein the speaker information comprises speaker entries each identifying an associated one of the speakers;

means for searching for a speaker entry that belongs to a new audio packet;

means for searching for a non-active speaker entry when no existing speaker entry exists for the new audio packet; and means for replacing an identified non-active speaker entry with a new speaker entry for the new audio packet.

31. A system according to claim 30 including:

means for identifying an active speaker entry not actively talking for the longest amount of time when no non-active speaker entry is identified;

means for determining whether the identified active speaker entry has stopped talking;

means for replacing the identified active speaker entry with a new speaker entry for the new audio packet if the identified active speaker entry has stopped talking; and means for discarding the current packet when the identified active speaker entry is still actively talking.

32. A system for managing multiple speakers in a packet network comprising:

means for receiving audio packets from the multiple speakers over the packet network;

means for selectively storing speaker information for the multiple speakers;

means for selectively storing or discarding the received audio packets and mixing stored audio packets to produce an audio output signal by determining from the stored speaker information which speakers are actively talking, when speakers have stopped actively talking and which speakers are not likely to start actively talking;

wherein the speaker information comprises speaker entries each identifying an associated one of the speakers;

means for identifying for each speaker entry the following:
  a speaker identification value;
  when the speaker last talked;
  how long it appears that the speaker has been talking;
  speaker statistics;
  a tag indicating the speaker activity status; and
  a pointer to a buffer for storing an audio portion of associated audio packets.

33. An computer readable storage medium containing software for managing multiple speakers in a packet network, the software comprising:
  code for receiving audio packets from the multiple speakers over the packet network;
  code for selectively storing speaker information for the multiple speakers;
  code for selectively storing or discarding the received audio packets and mixing stored audio packets to produce an audio output signal by determining from the stored speaker information which speakers are actively talking, when speakers have stopped actively talking and which speakers are not likely to start actively talking;
  wherein the speaker information comprises speaker entries each identifying an associated one of the speakers; and
  code for replacing the stored speaker information for one of the speakers that has been identified as not likely to start actively talking with speaker information for a newly identified active speaker.

34. A computer readable storage medium containing software for managing multiple speakers in a packet network, the software comprising:
  code for receiving audio packets from the multiple speakers over the packet network;
  code for selectively storing speaker information for the multiple speakers;
  code for selectively storing or discarding the received audio packets and mixing stored audio packets to produce an audio output signal by determining from the stored speaker information which speakers are actively talking, when speakers have stopped actively talking and which speakers are not likely to start actively talking;
  wherein the speaker information comprises speaker entries each identifying an associated one of the speakers;
  code for receiving a new audio packet;
  code for identifying any speaker entry belonging to the new audio packet; and
  code for updating a LRU time and a Talkspurt Count for any identified speaker entry.

35. A computer readable storage medium containing software for managing multiple speakers in a packet network, the software comprising:
  code for receiving audio packets from the multiple speakers over the packet network;
  code for selectively storing speaker information for the multiple speakers;
  code for selectively storing or discarding the received audio packets and mixing stored audio packets to produce an audio output signal by determining from the stored speaker information which speakers are actively talking, when speakers have stopped actively talking and which speakers are not likely to start actively talking;
  wherein the speaker information comprises speaker entries each identifying an associated one of the speakers;
  code for receiving a new audio packet;
  code for identifying any speaker entry belonging to the new audio packet; and
  code for storing the new audio packet in memory when a speaker entry is identified and labeled as belonging to a speaker who is actively talking.

36. A computer readable storage medium according to claim 35 including the following:
  code for checking whether a current number of active speaker entries is less than available audio packet storage; and
  code for storing the new audio packet in memory when the speaker entry for the new audio packet is not active but the available packet storage is greater than the number of active speaker entries.

37. A computer readable storage medium containing software for managing multiple speakers in a packet network, the software comprising:
  code for receiving audio packets from the multiple speakers over the packet network;
  code for selectively storing speaker information for the multiple speakers;
  code for selectively storing or discarding the received audio packets and mixing stored audio packets to produce an audio output signal by determining from the stored speaker information which speakers are actively talking, when speakers have stopped actively talking and which speakers are not likely to start actively talking;
  wherein the speaker information comprises speaker entries each identifying an associated one of the speakers;
  code for changing a first speaker entry from active to not active and changing a second speaker entry for a current audio packet to active when the first speaker entry has not generated an audio packet for a predetermined amount of time or when the first speaker entry has generated more than a predetermined number of audio packets in one continuous audio stream.

38. A computer readable storage medium containing software for managing multiple speakers in a packet network, the software comprising:
  code for receiving audio packets from the multiple speakers over the packet network;
  code for selectively storing speaker information for the multiple speakers;
  code for selectively storing or discarding the received audio packets and mixing stored audio packets to produce an audio output signal by determining from the stored speaker information which speakers are actively talking, when speakers have stopped actively talking and which speakers are not likely to start actively talking;
  wherein the speaker information comprises speaker entries each identifying an associated one of the speakers; and code for replacing an unused speaker entry with a speaker entry for a new audio packet when the new audio packet does not belong to an existing speaker entry.

39. A computer readable storage medium containing software for managing multiple speakers in a packet network, the software comprising:

code for receiving audio packets from the multiple speakers over the packet network;

code for selectively storing speaker information for the multiple speakers;

code for selectively storing or discarding the received audio packets and mixing stored audio packets to produce an audio output signal by determining from the stored speaker information which speakers are actively talking, when speakers have stopped actively talking and which speakers are not likely to start actively talking;

wherein the speaker information comprises speaker entries each identifying an associated one of the speakers;

code for searching for a speaker entry that belongs to a new audio packet;

code for searching for a non-active speaker entry when no existing speaker entry exists for the new audio packet; and code for replacing an identified non-active speaker entry with a new speaker entry for the new audio packet.

40. A computer readable storage medium according to claim 39 including:

code for identifying an active speaker entry not actively talking for the longest amount of time when no non-active speaker entry is identified;

code for determining whether the identified active speaker entry has stopped talking;

code for replacing the identified active speaker entry with a new speaker entry for the new audio packet if the identified active speaker entry has stopped talking; and code for discarding the current packet when the identified active speaker entry is still actively talking.

41. A computer readable storage medium containing software for managing multiple speakers in a packet network, the software comprising:

code for receiving audio packets from the multiple speakers over the packet network;

code for selectively storing speaker information for the multiple speakers;

code for selectively storing or discarding the received audio packets and mixing stored audio packets to produce an audio output signal by determining from the stored speaker information which speakers are actively talking, when speakers have stopped actively talking and which speakers are not likely to start actively talking;

wherein the speaker information comprises speaker entries each identifying an associated one of the speakers;

code for identifying for each speaker entry the following:
a speaker identification value;
when the speaker last talked;
how long it appears that the speaker has been talking;
speaker statistics;
a tag indicating the speaker activity status; and
a pointer to a buffer for storing an audio portion of associated audio packets.

* * * * *